(12) United States Patent
Luce et al.

(10) Patent No.: US 8,186,620 B2
(45) Date of Patent: May 29, 2012

(54) ADJUSTABLE LANDING GEAR SYSTEM

(75) Inventors: William E. Luce, Colleyville, TX (US); Phillip K. Wilson, Dalworthington Gardens, TX (US); Jonathon R. Davis, Fort Worth, TX (US)

(73) Assignee: Goodrich Corporation, Charlotte, NC (US)

( * ) Notice: Subject to any disclaimer, the term of this patent is extended or adjusted under 35 U.S.C. 154(b) by 359 days.

(21) Appl. No.: 12/491,021

(22) Filed: Jun. 24, 2009

(65) Prior Publication Data

US 2009/0321560 A1 Dec. 31, 2009

Related U.S. Application Data

(60) Provisional application No. 61/075,484, filed on Jun. 25, 2008.

(51) Int. Cl.
*B64C 25/10* (2006.01)
(52) U.S. Cl. .......... 244/102 SS; 244/102 R; 244/102 SL
(58) Field of Classification Search .............. 244/102 R, 244/102 A, 102 SL, 102 SS, 236
See application file for complete search history.

(56) References Cited

U.S. PATENT DOCUMENTS

| 4,524,929 | A | * | 6/1985 | Gebhard | 244/63 |
| 4,540,142 | A | * | 9/1985 | Veaux et al. | 244/102 R |
| 4,634,082 | A |   | 1/1987 | Kendall | |
| 5,022,609 | A | * | 6/1991 | Cranston | 244/102 R |
| 5,299,761 | A |   | 4/1994 | Robin et al. | |
| 5,310,140 | A | * | 5/1994 | Veaux et al. | 244/104 FP |
| 5,908,174 | A |   | 6/1999 | Churchill et al. | |
| 2009/0050736 | A1 | * | 2/2009 | Bennett et al. | 244/102 R |
| 2009/0108131 | A1 | * | 4/2009 | Lavigne et al. | 244/102 A |
| 2009/0127388 | A1 | * | 5/2009 | Herzberger et al. | 244/101 |
| 2010/0181422 | A1 | * | 7/2010 | Thompson et al. | 244/102 A |

* cited by examiner

*Primary Examiner* — Joshua J Michener
*Assistant Examiner* — Medhat Badawi
(74) *Attorney, Agent, or Firm* — Scott D. Wofsy; Edwards Wildman Palmer LLP (57) ABSTRACT

A landing gear system includes a shock strut assembly and a linkage member coupled to an aircraft. Preferably, the shock strut assembly and linkage member are oriented or angled relative to one another in a non-parallel relationship. Actuation of the linkage member moves the shock strut from a de-hiked to a hiked configuration or vice-versa. In addition, the orientation of the linkage member relative to the shock strut assembly permits it to automatically move the shock strut assembly to the de-hiked position during retraction of the landing gear system and prevents the shock strut assembly from exceeding a desired length during retraction. The linkage member may take the form of a hydraulic actuator having a lower end portion coupled to an inner cylinder of the shock strut assembly and an upper end portion coupled to the aircraft aft of where the shock strut assembly is coupled to the aircraft.

22 Claims, 5 Drawing Sheets

ADJUSTABLE LANDING GEAR SYSTEM

PRIORITY CLAIM

This application claims priority to U.S. Provisional Patent Application No. 61/075,484 (filed on Jun. 25, 2008), and wherein its subject matter is incorporated herein by reference in its entirety.

FIELD OF THE INVENTION

The present invention relates generally to aircraft landing gear, and more specifically to an adjustable landing gear system.

BACKGROUND OF THE INVENTION

During takeoff, many aircraft have an engine thrust to aircraft weight ratio and a wing aspect ratio that generates a sufficient amount of lift to allow the aircraft to fly at a speed less than the actual takeoff speed. Nevertheless, most aircraft are unable to achieve liftoff until the actual takeoff speed is achieved because the sum of the nose down thrust couple and aircraft inertial moment about the main wheel axis exceeds the available, nose-up aerodynamic control moment.

Some proposals for allowing an aircraft to takeoff at a lower speed have included fixed length extensions incorporated into the nose landing gear system to increase a pre-flight angle of attack for the aircraft. However, some drawbacks of such a fixed length extension are that it increases the applied forces to the aircraft during landing and it requires more stowage space within the aircraft when retracted.

To address the aforementioned drawbacks, at least one hikeable and de-hikeable nose landing gear system has been developed. This system generally includes an upper cylinder attached to the aircraft and a piston/cylinder assembly coaxially mounted in the upper cylinder for moving the upper cylinder relative to a wheel assembly of the nose landing gear and in a direction that is substantially parallel to an upper cylinder axis. In this system, the free end of the piston-cylinder assembly is farthest from the aircraft and is coupled to the wheel assembly. A de-hiked, static configuration of the nose landing gear system includes the wheel assembly positioned at a first distance from the aircraft; whereas a hiked, static configuration includes the wheel assembly positioned at a second, and farther, distance from the aircraft. The static configuration is generally defined as when the aircraft is stationary (i.e., non-moving) with a weight of the aircraft respectively distributed on the nose and main landing gear systems.

A shock strut of the aforementioned hikeable and de-hikeable nose landing gear system may be lengthened or shortened by pressurizing the coaxially mounted piston-cylinder assembly. Thus before takeoff, the piston-cylinder assembly is pressurized, biased or otherwise actuated to lengthen the shock strut and increase the pre-flight angle of attack for the aircraft. After takeoff, the piston-cylinder assembly is actuated to shorten the shock strut before retraction of the nose landing gear system into a stowage compartment or nose landing gear bay.

SUMMARY OF THE INVENTION

The present invention provides an adjustable landing gear system, which may take the form of a nose landing gear system, that includes a linkage member oriented with respect to a shock strut that operates to hike or de-hike the landing gear system while automatically shortening the shock strut, if necessary, upon retraction of the landing gear system into a stowage compartment of an aircraft. More particularly, the linkage member may have a first end mounted to the aircraft and a second end mounted to a cylinder of the shock strut. Further, the linkage member may include a linkage member longitudinal axis oriented at an angle other than zero degrees (i.e., other than parallel) with respect to a longitudinal axis of the shock strut. The linkage member may take the form of a hydraulic actuator configured to hike or de-hike the shock strut and may be operated to lock the landing gear system in a desired position, whether in the hiked, de-hiked or some other position.

In accordance with an aspect of the invention, a landing gear system for an aircraft includes a shock strut assembly having a housing, a cylinder and a piston, wherein the piston is movably receivable with respect to the cylinder and the housing is sized to telescopically receive at least a portion of the cylinder, the housing pivotally coupled to the aircraft at a first longitudinal distance from an aircraft center of gravity; and a linkage member having a first portion moveable relative to a second portion, the first portion pivotally coupled to the aircraft at a second longitudinal distance from the aircraft center of gravity, the second longitudinal distance aft of the first longitudinal distance by a desired amount, the second portion pivotally coupled to the cylinder, the linkage member actuatable from a first length to a second length to change a pre-flight angle of attack of the aircraft when the landing gear system is in a deployed configuration.

According to another aspect of the invention, a landing gear system for an aircraft includes a shock strut assembly having a housing, a cylinder and a piston, wherein the piston is movably receivable by the cylinder and the housing is sized to telescopically receive at least a portion of the cylinder, the housing pivotally coupled to the aircraft at a first distance from an aircraft center of gravity; and a linkage member having a first portion moveable relative to a second portion along a linkage member longitudinal axis, the first portion pivotally coupled to the aircraft at a second distance from the aircraft center of gravity, the second portion pivotally coupled to the cylinder, wherein based on an orientation of the linkage member longitudinal axis relative to a shock strut longitudinal axis the linkage member is configured to urge the shock strut assembly into a stowed configuration upon retraction of the landing gear system.

According to yet another aspect of the invention, a method of operating a landing gear system of an aircraft includes the steps of (1) moving the landing gear system to a deployed configuration with the shock strut in a de-hiked configuration relative to the aircraft; (2) actuating a linkage member to urge the shock strut from the de-hiked configuration to a hiked configuration while the aircraft is static, the linkage member having a first end portion coupled to a telescoping cylinder of the shock strut and a second end portion coupled to the aircraft in a location aft of where the shock strut is coupled to the aircraft; and (3) while retracting the landing gear system from the deployed configuration to a stowed configuration, shortening the shock strut through operation of a kinematic relationship between the linkage member and the shock strut.

In the drawings, identical reference numbers identify similar elements or acts. The sizes and relative positions of elements in the drawings may not be necessarily drawn to scale. For example, the shapes of various elements and angles may not be drawn to scale, and some of these elements may be arbitrarily enlarged or positioned to improve drawing legibility. In addition, some features may be shown schematically or in an outline fashion to merely indicate their presence and/or position relative to other features.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with landing gear systems and the assembly and operation thereof have not necessarily been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
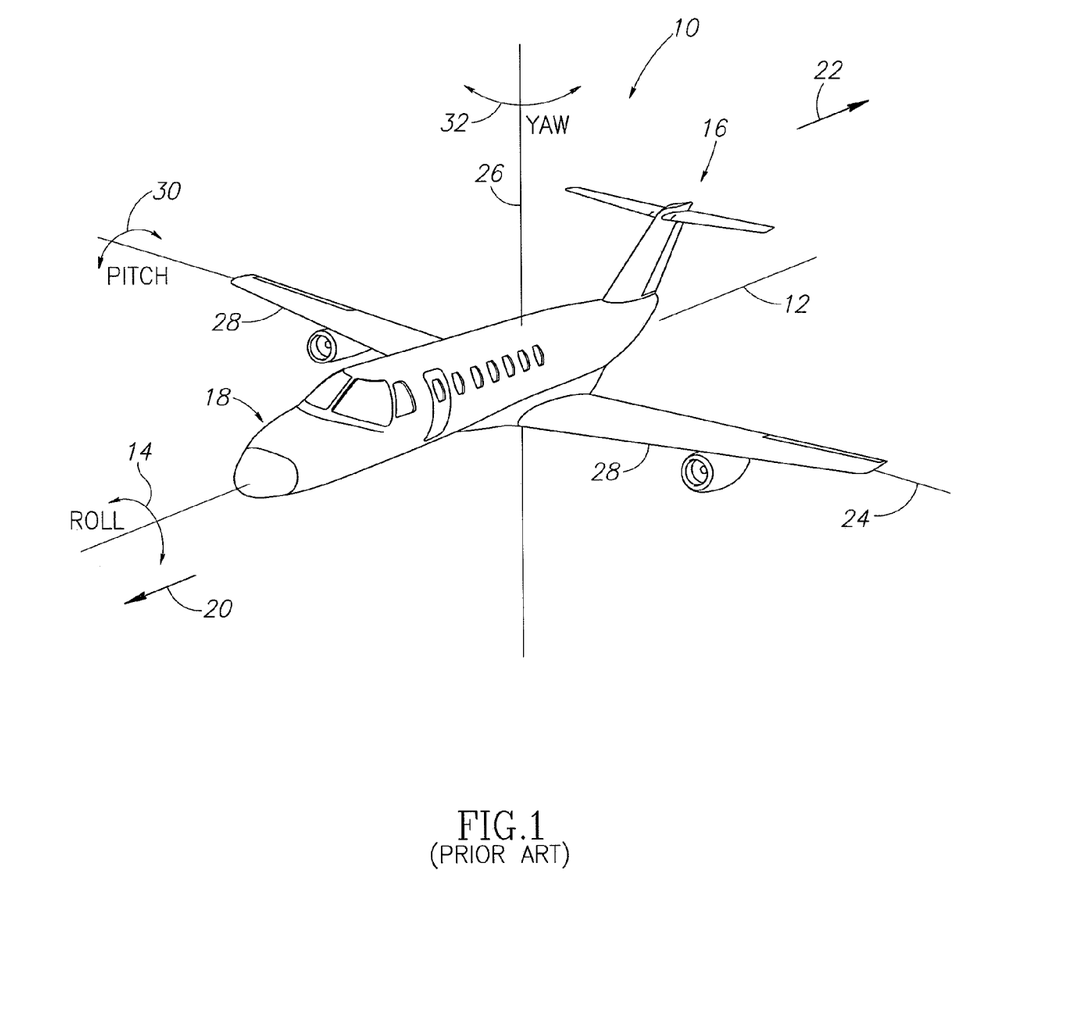
FIG. 1 is a perspective view of an aircraft with corresponding aircraft axes.

In addition, throughout the specification and claims which follow, the word "longitudinal" is meant as a broad term that relates a length of an item. By way of example, FIG. 1 shows an aircraft 10 having an aircraft longitudinal axis 12, also referred to as a roll axis about which the aircraft may be maneuvered to roll 14. The longitudinal axis 12 corresponds to an axis drawn through the body of the aircraft from tail 16 to nose 18 in a normal direction of flight 20 and parallel to a waterline (not shown). Thus the term "aft," indicated by an aft directional arrow 22, generally refers to a direction from the nose 18 toward the tail 16 along or parallel to the longitudinal axis 12. In addition to the aircraft 10 having a longitudinal axis 12, the aircraft further includes a lateral axis 24 and a vertical axis 26. The lateral axis 24, also referred to as a pitch or transverse axis, is an axis running parallel to the wings 28 of a winged aircraft and parallel to a buttock line (not shown). The lateral axis 24 is the axis about which the aircraft may be maneuvered to pitch 30 (e.g., nose up or nose down). The vertical axis 26, also referred to as a yaw axis, is an axis perpendicular to the other two axes, 12, 24 and parallel to a fuselage station (not shown). The vertical axis 26 is the axis about which the aircraft may be maneuvered to yaw 32 (e.g., left turn or right turn).

In addition to the aircraft axes, 12, 24, 26, the components of the aircraft 10 may also have their own axis system. For example, a longitudinal axis as used herein for a cylindrical component, which may take the form of a fuselage, a shock strut assembly, a linkage member, an actuator, etc. may be understood to generally correspond to an axisymmetric or cylindrical axis of the component. In other words, the longitudinal axis for a particular component is generally defined by its length.

Figure 2:
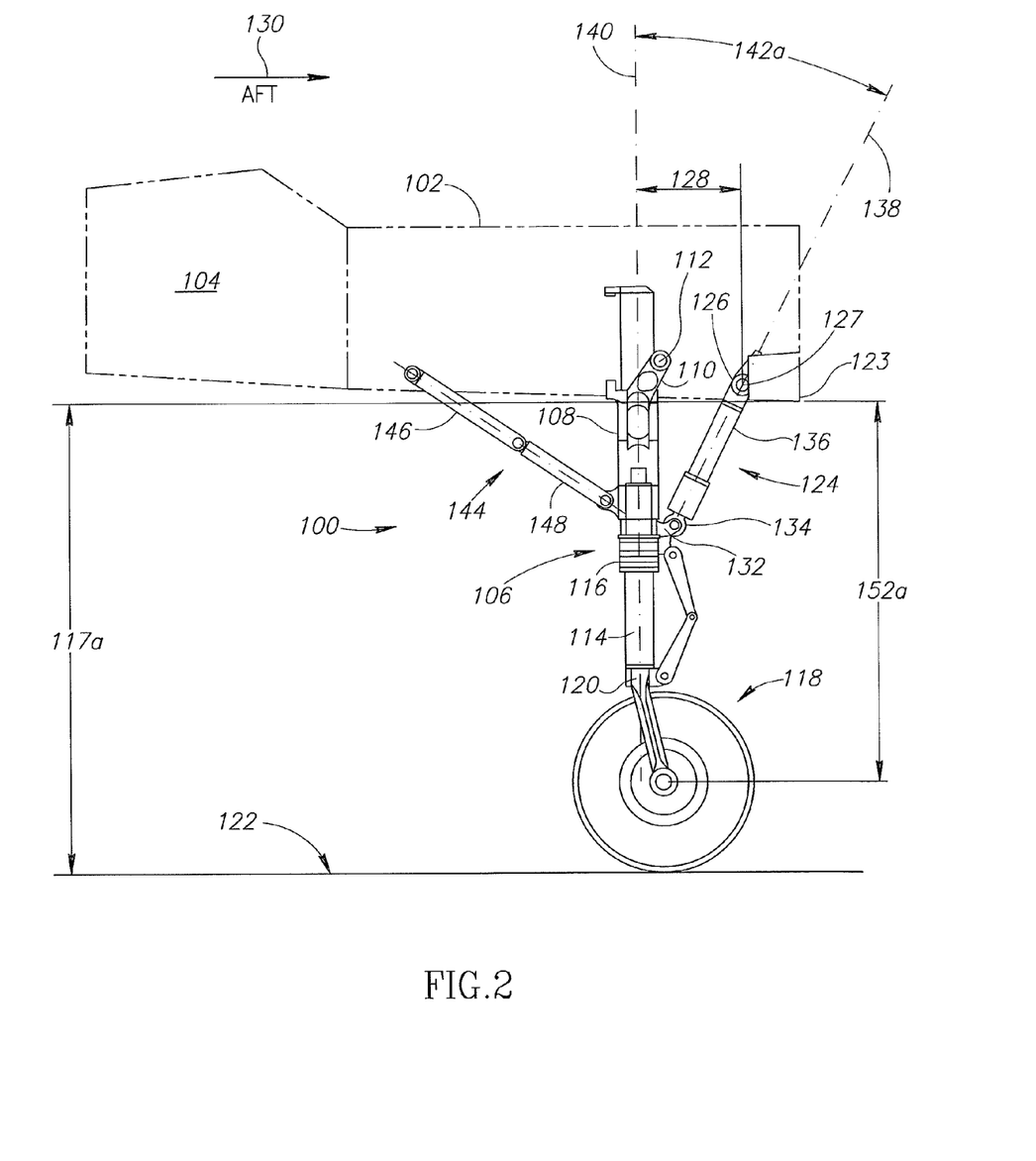
FIG. 2 is a side elevational view of a landing gear system having a shock strut assembly and a linkage member coupled to an aircraft (shown schematically), the shock strut assembly and the linkage member are shown in a de-hiked and deployed position according to an embodiment of the present invention.

FIG. 2 shows a landing gear system 100 in the deployed and de-hiked configuration. The landing gear system 100 is deployed relative to an aircraft 102 has been commanded or otherwise deployed out of a stowage compartment or landing gear bay 104 of the aircraft. In the deployed and de-hiked configuration, the landing gear system 100 is capable of supporting at least some of the aircraft's weight.

The landing gear system 100 includes a shock strut assembly 106 that may generally operate through different states or compression ratios, which are the ratios of the pressure under one condition divided by the pressure under another condition. Generally, the shock strut assembly 106 is movable between a fully compressed state to a fully extended state. During normal operation during landing and taxi, the strut length (i.e., stroke) changes through action of the piston and cylinder arrangement described below. In addition, the shock strut assembly 106 may be moved to the deployed and de-hiked configuration, a deployed and hiked configuration, a retracted and de-hiked configuration, or a retracted and hiked configuration. In the deployed configurations, the landing gear system 100 statically supports a portion of the aircraft weight, but the shock strut assembly 106 may be at different lengths (e.g., de-hiked versus hiked), as will be explained in greater detail below. As used herein, the term "hiked" refers to any length of the shock strut assembly 106 that exceeds the de-hiked length, but does not include the fully extended length.

The shock strut assembly 106 includes an outer cylinder 108 having an upper end portion 110 pivotally mounted at a shock strut pivot 112 to the aircraft 102. The shock strut assembly 106 further includes a piston 114 and an inner cylinder 116 receivable within the outer cylinder 108. The piston 114 communicates forces to and from a wheel assembly 118 coupled to the piston 114 through a mounting member 120. In one embodiment, the inner cylinder 116 receives the piston 114 in a manner that permits relative telescoping movement between the inner cylinder 116 and the piston 114 to absorb, transfer, and/or dampen inertial, impact, operational and/or other forces that may be transmitted from landing gear system 100 and/or the aircraft 102 to a ground surface 122, such as, but not limited to a runway, tarmac or takeoff surface.

As noted, the piston 114 may be telescopically receivable by the inner cylinder 116, and the inner cylinder 116, in turn, may be telescopically receivable by the outer cylinder 108. The telescoping movement between the inner and outer cylinders, 116, 108, respectively, operates to increase or decrease the length of the shock strut assembly 106. Further, a relative position between the inner and outer cylinders, 116, 108 determines whether the shock strut assembly 106 is in the deployed and de-hiked configuration or deployed and hiked configuration. As best shown in FIG. 2, the deployed and de-hiked position is illustrated by a vertical distance 117a between the general surface 122 and a first portion 123 of the aircraft.

A linkage member 124 operates to adjust the length of the shock strut assembly 106 and generate the telescoping movement of the inner cylinder 116 relative to the outer cylinder 108. The linkage member 124 includes an upper end portion 126 pivotally coupled to the aircraft 102 at a linkage member upper pivot 127, which is at a first longitudinal distance 128 located aft 130 of the shock strut pivot 112. The linkage member 124 further includes a lower end portion 132 pivotally coupled to the inner cylinder 116. The linkage member 124 may take the form of a hydraulic actuator having an actuator piston rod 134 received by an actuator cylinder 136; although other types of linkage members may be used in accordance with the present invention to accomplish the purposes discussed herein. In one embodiment, the linkage member 124 may take the form of a self-locking actuator that locks in a desired position while still being able to transmit load from the aircraft 102 to the shock strut assembly 106. Movement of the actuator piston 134 relative to the actuator cylinder 136 operates to shorten or lengthen the shock strut assembly 106 and accordingly move the shock strut assembly 106 from the de-hiked to the hiked configuration or vice versa when the landing gear system 100 is in the deployed position.

The components of the linkage member 124, namely the actuator piston rod 134 and the actuator cylinder 136, are generally concentrically aligned with a linkage member longitudinal axis 138. The components of the shock strut assembly 106, namely the outer cylinder 108, the piston 114 and the inner cylinder 116, are generally concentrically aligned with a shock strut longitudinal axis 140. In turn, the linkage member longitudinal axis 138 is oriented with respect to the shock strut longitudinal axis 140 according to an included angle 142. In one embodiment, the included angle 142a is in a range of about 0-45 degrees, where zero degrees corresponds with the actuator 124 being aligned substantially parallel or parallel with the shock strut assembly 106.

Figure 5:
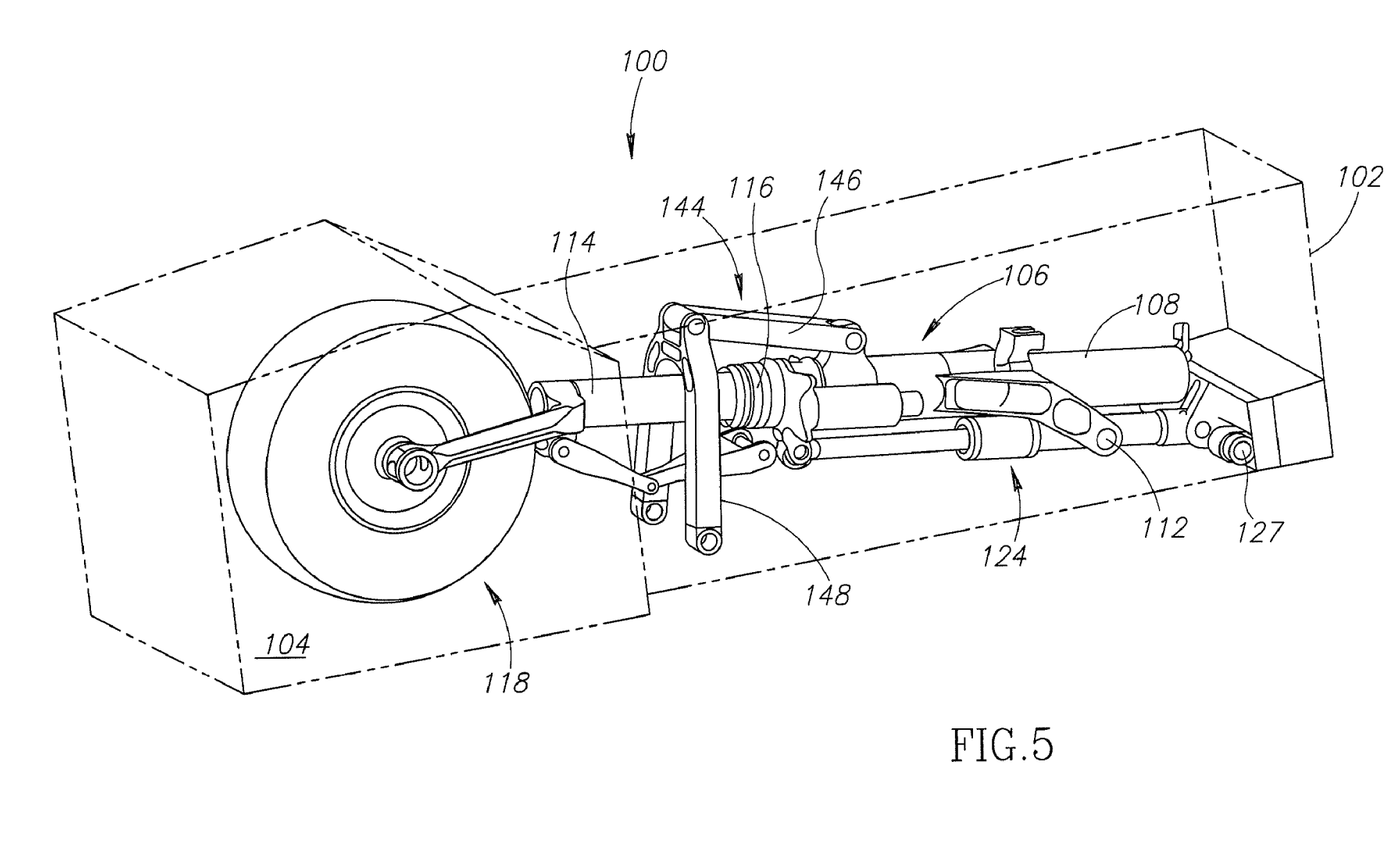
FIG. 5 is a perspective view of the landing gear system of FIG. 2 in the hiked and a retracted position and further stowed in a stowage compartment of the aircraft according to an embodiment of the present invention.

The landing gear system 100 may further include a brace 144 extending between the outer cylinder 108 and the aircraft 102. In one embodiment, the brace takes the form of a locking type brace with an upper member 146 and a lower member 148. In one embodiment, the upper member 116 is pivotally coupled to the aircraft 102 and includes U-shaped, forked arms sized to receive a portion of the shock strut assembly 106 when the landing gear system 100 is in a stowed configuration (FIG. 5). The lower member 148 may take the form of a bar, link or some other two-force member with each end pivotally and coupled to the upper member 146 and the outer cylinder 108, respectively. The brace 114 operates to stabilize the landing gear system 100 in the deployed position, whether hiked or de-hiked.

Figure 3:
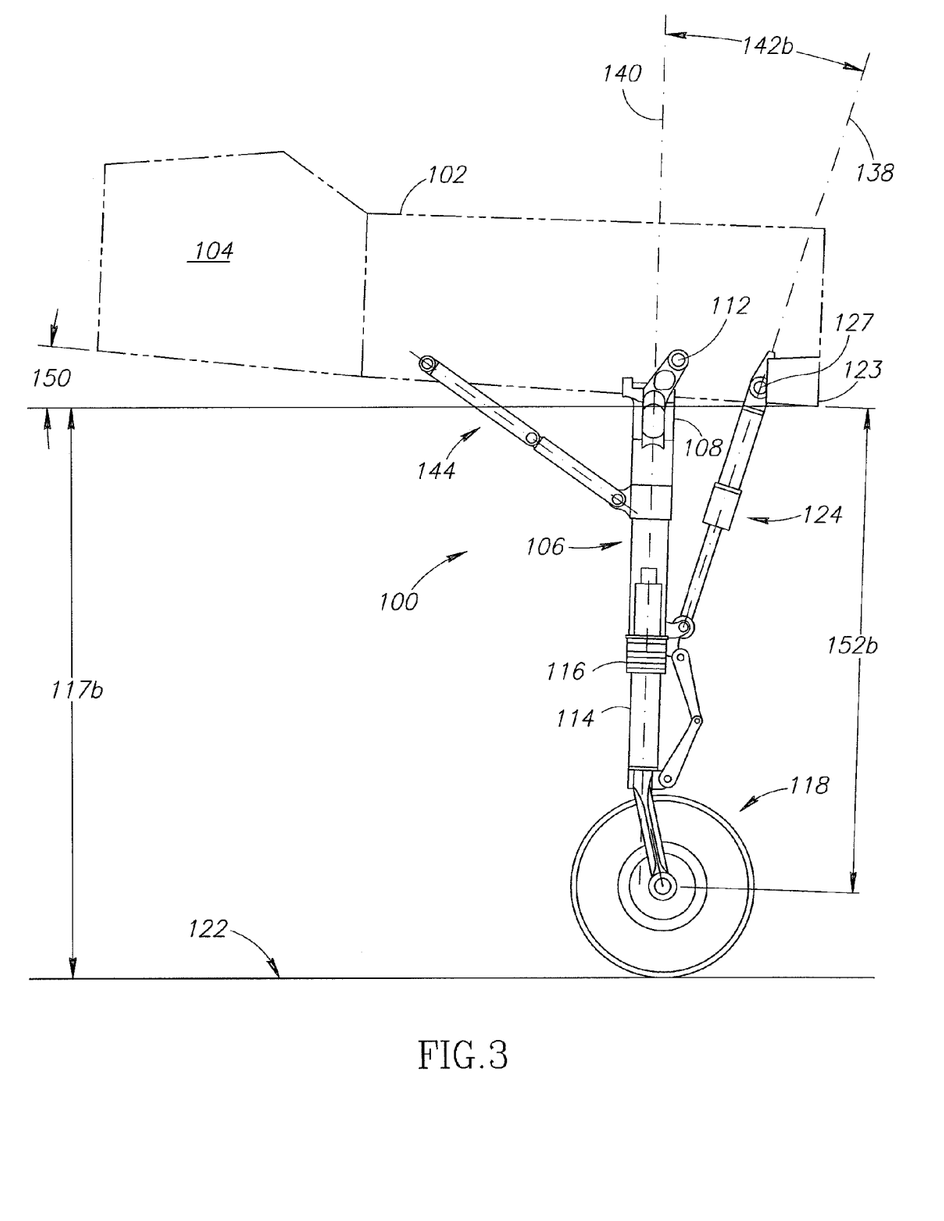
FIG. 3 is a side elevational view of the landing gear system of FIG. 2 showing both the shock strut assembly and the linkage member in a hiked and a deployed position according to an embodiment of the present invention.

FIG. 3 shows the shock strut assembly 106 in the hiked configuration with the linkage member 124 extended and the wheel assembly 118 shifted downward relative to the aircraft 102. The deployed and hiked configuration is shown by a second vertical distance 117b from the ground surface 122 to the first portion 123 of the aircraft 102. In addition, FIG. 3 shows a pre-flight angle of attack 150 of the aircraft 102 that comes into existence or increases when the shock strut assembly 106 is moved to the deployed and hiked configuration. As noted above, the shock strut assembly 106 may be moved to any position between the deployed and de-hiked configuration and the fully extended configuration, as desired. However, when the aircraft 102 is on the ground and in motion, the shock strut assembly 106 should be in one of the hiked or de-hiked configurations because the inner cylinder 116 may be keyed to the outer cylinder 108 to maintain alignment. If it is desirable to hike or de-hike while in motion on the ground, then a set of torque arms or an equivalent alignment device may be used to maintain alignment of the shock strut assembly 106. In the deployed and hiked configuration, a hiked distance 152b between the aircraft 102 and the wheel assembly 118 is greater than a de-hiked distance 152a shown in FIG. 2. Further in the deployed and hiked configuration, the included angle 142b is decreased or smaller than the included angle 142a, which is illustrated in FIG. 2 when the shock strut assembly 106 is in the deployed and de-hiked configuration.

Figure 4:
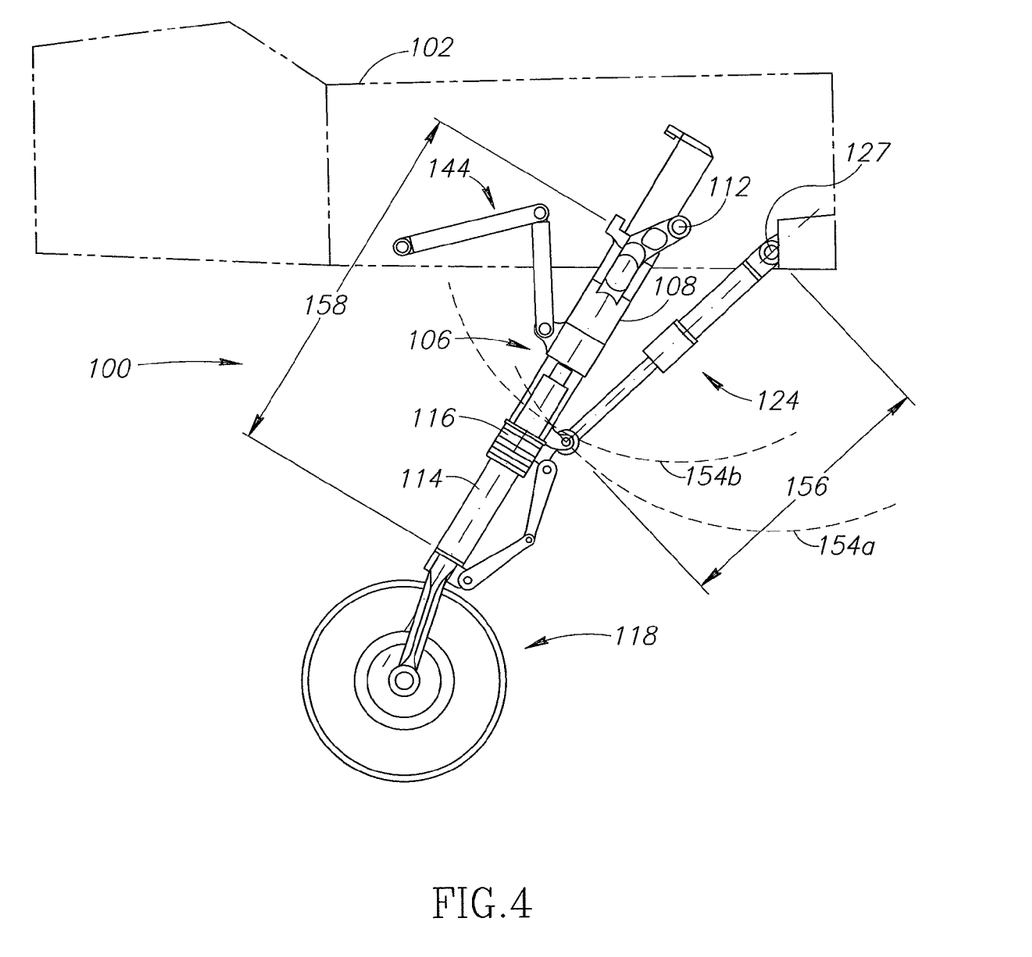
FIG. 4 is a side elevational view of the landing gear system of FIG. 2 showing both the shock strut assembly and the linkage member in a hiked and a partially deployed position according to an embodiment of the present invention.

FIG. 4 shows the landing gear system 100 during retraction in the deployed and hiked configuration (FIG. 3) and being moved to the stowed configuration (FIG. 5). A retracting/deploying mechanism (not shown), moves the shock strut assembly 106 about the linkage member upper pivot 127. During retraction of the landing gear system 100 to the stowed position (FIG. 5), the linkage member 124 operates to restrain movement of the inner cylinder 108 along a path 154a, which may take the form of an arc. The path 154a corresponds to a desired, extended length 156 of the linkage member 124. The desired, extended length 156 may be selected to be a maximum extended length of the linkage member 124 or a lesser length. Regardless, the desired, extended length 156 operates to adjust a retraction length 158 of the shock strut assembly 106 as the landing gear system 100 is retracted. Due to the relative positions of the shock strut pivot 112, the linkage member upper pivot 127 and the orientation of the shock strut assembly 106 in relationship to the linkage member 124, the linkage member 124 functions to automatically adjust the retraction length 158 of the shock strut assembly 106. In one embodiment, as the shock strut assembly 106 is rotated into the stowed position (FIG. 5), the inner cylinder 116 is drawn back to the de-hiked position as the retraction length 158 of the shock strut assembly 106 is shortened.

In the event that the landing gear system 100 is retracted from the deployed and de-hiked configuration (FIG. 2) to the stowed configuration (FIG. 5), which may happen during takeoff or during a touch-and-go maneuver where the de-hiked configuration would be desirable, the linkage member 124 would be in a compressed position and the inner cylinder 116 would be un-hiked relative to the outer cylinder 108. This relationship between the inner and outer cylinders 116, 108 would remain the same during retraction, but the linkage member 124 would extend to the hiked position. As such, the landing gear system 100 would be retracted generally along a path 154b, which is centered on the shock strut pivot 112 rather than the linkage member upper pivot 127.

As a consequence of the orientation of the shock strut assembly 106 with regard to the linkage member 124 as described above, FIG. 5 shows that the shock strut assembly 106 ends up in both a stowed and de-hiked configuration. In addition, the desired, extended length 156 of the linkage member 124 may prevent the shock strut assembly 106 from being hiked or extended beyond the maximum extended length of the linkage member 124. Advantageously, this may prevent unintended or undesired extensions while the shock strut assembly 106 is being stowed or after stowage. If the linkage member 124 is not at its maximum extended length then it may be kept static by way of a hydraulic lock. Due to the volume and configuration of the stowage compartment 104, the landing gear system generally cannot be stowed unless it is in the de-hiked position to minimize or eliminate the potential for jamming or unwanted interference.

Under normal operation, the retracting/deploying mechanism may be energized to deploy the landing gear system 100 from the stowed position. As the landing gear system 100 is initially deployed from the stowed position, the linkage member 124 may be locked and maintained in the maximum extended position such that the shock strut assembly 106 ends up being fully hiked after deployment. Alternatively, the linkage member 124 may be adjusted to move the shock strut assembly into other positions, between and including the de-hiked position, during deployment. As described above, the shock strut assembly 106 may be de-hiked before landing by actuating the linkage member 124 in the manner previously described. Alternatively, during deployment, the linkage member 124 may be actuated such that upon full deployment, the shock strut assembly 106 is in the de-hiked configuration. In another embodiment, the landing gear system 100 may be designed to allow increased landing loads in the event of a failure, such as a failure to de-hike or unlock the linkage member 124 before landing the aircraft 102. In such an event however, it would be preferable to reduce the landing loads through operating the aircraft 102 to have a decreased sink velocity or a lighter mass.

The landing gear system 100 may be stowed from either the de-hiked or hiked position. If the landing gear system 100 is moved to the stowed position from the de-hiked position, the linkage member 124 may be extended until it reaches its maximum length. In one embodiment, regardless of the state of the shock strut assembly 106 as the landing gear system 100 commences stowage, the linkage member 124 operates to automatically adjust the shock strut assembly 106 to an appropriate length before the wheel assembly 118 enters the stowage compartment 104.

The hiking and de-hiking functions performed by the linkage member 124 may be performed by a wide variety of devices, such as, but not limited to, actuators having different locations and orientations than shown in the figures and as described above. In one such alternate embodiment, the linkage member 124 may be located within (e.g., internal to) the inner cylinder 116 or the outer cylinder 108. In another embodiment, the linkage member 124 may be lockable at either a maximum length or a minimum length without locking there between.

Generally, the hiking of the shock strut assembly 106 corresponds to an increase in the height of the aircraft 102 with respect to the surface 122 (FIG. 3) upon which the wheel assembly 118 is traveling. Accordingly, if the landing gear system 100 is a nose landing gear system, the nose of the aircraft 102 will be raised with respect to the surface 122 provided the rear landing gear system of the aircraft 102 remains unchanged. Hence, the aircraft 102, after the shock strut assembly 106 has been hiked, will have a nose-up pitch configuration, or as described above with respect to the pre-flight angle of attack 150 (FIG. 3), thereby resulting in increased lift for the wings of the aircraft 102. The landing gear system 100 may include suitable controls for allowing a pilot of the aircraft 102 to selectively activate the linkage member 124 depending on a variety of takeoff conditions. After a hiked takeoff, no additional input from the pilot or any other source is necessary to de-hike the shock strut assembly 106 before stowing because the linkage member 124 operates to automatically configure the shock strut assembly 106 into the stowed and de-hiked configuration (FIG. 5).The various embodiments described above can be combined to provide further embodiments. All of the above U.S. patents, patent applications and publications referred to in this specification are incorporated herein by reference. Aspects can be modified, if necessary, to employ devices, features, methods and concepts of the various patents, applications and publications to provide yet further embodiments.

These and other changes can be made in light of the above detailed description. In general, in the following claims, the terms used should not be construed to limit the invention to the specific embodiments disclosed in the specification and the claims, but should be construed to include all types of aircraft, landing gear systems, shock struts, linkage members, actuators, methods and other aspects that operate in accordance with the claims. Accordingly, the invention is not limited by the disclosure, but instead its scope is to be determined entirely by the following claims.

The embodiments of the invention in which an exclusive property or privilege is claimed are defined as follows:

1. A landing gear system for an aircraft, the landing gear system comprising:
   a shock strut assembly having a housing, a cylinder and a piston, wherein the piston is movably receivable with respect to the cylinder and the housing is sized to telescopically receive at least a portion of the cylinder, the housing being configured and adapted to be pivotally coupled to the aircraft at a first longitudinal distance from an aircraft center of gravity; and
   a linkage member having a first portion configured and adapted to be pivotally coupled to the aircraft at a second longitudinal distance from the aircraft center of gravity, the second longitudinal distance aft of the first longitudinal distance by a desired amount, and a second portion pivotally connected to a pivot point on the cylinder, wherein the first portion of the linkage member is moveable relative to the second portion of the linkage member, the linkage member being actuatable from a first length to a second length to change a pre-flight angle of attack of the aircraft when the landing gear system is in a deployed configuration, and
   wherein, at least a portion of the piston is movably received within the cylinder, and at least a portion of the cylinder is telescopically received within the housing.

2. The landing gear system of claim 1, wherein the piston is telescopically movable with respect to the cylinder.

3. The landing gear system of claim 1, wherein the first portion of the linkage member is an actuator cylinder and the second portion of the linkage member is an actuator piston.

4. The landing gear system of claim 1, wherein the linkage member is hydraulically lockable in the deployed configuration.

5. The landing gear system of claim 1, wherein the linkage member is a hydraulic actuator.

6. The landing gear system of claim 1, wherein the second length is longer than the first length to increase the angle of attack of the aircraft.

7. The landing gear system of claim 1, wherein the desired longitudinal distance is selected to permit the linkage member to urge the shock strut assembly into a stowed configuration upon retraction of the landing gear system into a stowage compartment.

8. The landing gear system of claim 1, wherein the linkage member is kinematically oriented relative to the shock strut assembly to permit the linkage member to decrease a length of the shock strut assembly from the deployed configuration to a stowed configuration upon retraction of the landing gear system into a stowage compartment.

9. A landing gear system for an aircraft, the landing gear system comprising:
   a shock strut assembly having a housing, a cylinder and a piston, wherein the piston is movably receivable by the cylinder and the housing is sized to telescopically receive at least a portion of the cylinder, the housing being configured and adapted to be pivotally coupled to the aircraft at a first distance from an aircraft center of gravity; and a linkage member having a first portion moveable relative to a second portion along a linkage member longitudinal axis, and configured and adapted to be pivotally coupled to the aircraft at a second distance from the aircraft center of gravity, the second portion pivotally connected to a pivot point on the cylinder, wherein based on an orientation of the linkage member longitudinal axis relative to a shock strut longitudinal axis the linkage member is configured to urge the shock strut assembly into a stowed configuration upon retraction of the landing gear system, wherein, at least a portion of the piston is movably received within the cylinder, and at least a portion of the cylinder is telescopically received within the housing.

10. The landing gear system of claim 9, further comprising a lockable brace having a first end portion coupled to the shock strut assembly and a second end portion coupled to the aircraft, wherein the second end portion is located forward of the first longitudinal location.

11. The landing gear system of claim 9, wherein the linkage member longitudinal axis is substantially parallel to the shock strut longitudinal axis.

12. The landing gear system of claim 9, wherein the linkage member longitudinal axis is oriented at an angle relative to the shock strut longitudinal axis.

13. The landing gear system of claim 12, wherein the angle is in a range of about 5 degrees to about 45 degrees relative to the shock strut longitudinal axis.

14. The landing gear system of claim 9, wherein the second distance is spaced apart from and located aft of the first distance.

15. The landing gear system of claim 9, wherein the linkage member is actuatable to extend from a first length to a second length while increasing a pre-flight angle of attack of the aircraft.

16. The landing gear system of claim 9, wherein the linkage member is actuatable to move the shock strut assembly from a de-hiked configuration to a hiked configuration while the aircraft is static.

17. A method of operating a landing gear system of an aircraft, the landing gear system having at least one shock strut including a piston movably received within the cylinder, the cylinder telescopically received within a housing, the method comprising:

moving the landing gear system to a deployed configuration with the shock strut in a de-hiked configuration relative to the aircraft;

actuating the cylinder, via a linkage member to urge the shock strut from the de-hiked configuration to a hiked configuration while the aircraft is static, the linkage member having a first end portion connected to a point on the cylinder of the shock strut and a second end portion coupled to the aircraft in a location aft of where the shock strut is coupled to the aircraft; and while retracting the landing gear system from the deployed configuration to a stowed configuration, shortening the shock strut through operation of a kinematic relationship between the linkage member and the shock strut.

18. The method of claim 17, wherein actuating a linkage member includes pressurizing hydraulic fluid within the linkage member.

19. The method of claim 17, wherein retracting the landing gear system to the stowed position includes moving the landing gear system into a landing gear bay of the aircraft.

20. The method of claim 17, wherein shortening the shock strut includes extending the linkage member to a maximum length when the shock strut is stowed from the de-hiked configuration.

21. The method of claim 17, wherein shortening the shock strut includes maintaining the linkage member at a maximum length when the shock strut is stowed from the hiked configuration.

22. The method of claim 17, further comprising locking the linkage member in one of at least the hiked or de-hiked configuration.

* * * * *

UNITED STATES PATENT AND TRADEMARK OFFICE
CERTIFICATE OF CORRECTION

PATENT NO. : 8,186,620 B2
APPLICATION NO. : 12/491021
DATED : May 29, 2012
INVENTOR(S) : William E. Luce et al.

It is certified that error appears in the above-identified patent and that said Letters Patent is hereby corrected as shown below:

In the Claims:

At column 10, claim number 17, line number 3, "the cylinder," should be changed to -- a cylinder, --.

Signed and Sealed this
Twelfth Day of February, 2013

Teresa Stanek Rea
*Acting Director of the United States Patent and Trademark Office*